Feb. 1, 1949.   R. J. THOMPSON   2,460,720
THREADED OPENING
Filed July 7, 1945
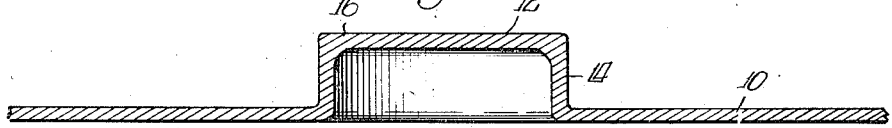
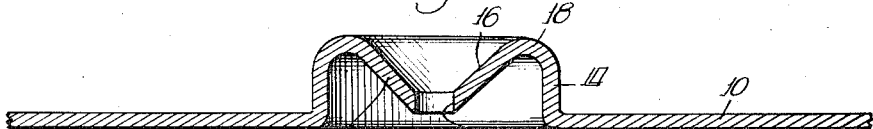
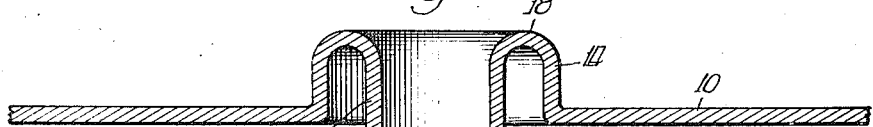
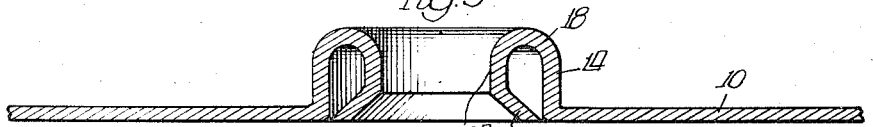
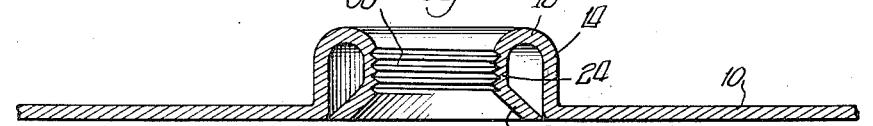
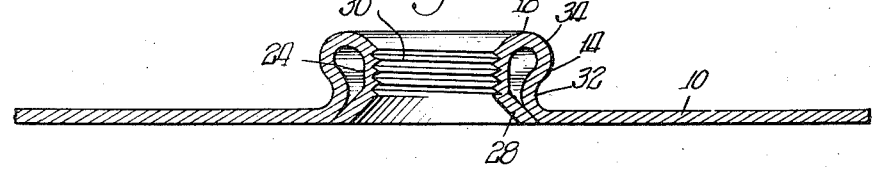
INVENTOR.
Roy J. Thompson,
BY
Wilkinson, Huxley, Byron & Knight
ATT'YS.

Patented Feb. 1, 1949

2,460,720

UNITED STATES PATENT OFFICE 2,460,720

THREADED OPENING

Roy J. Thompson, Gary, Ind., assignor to Inland Steel Company, Chicago, Ill., a corporation of Delaware Application July 7, 1945, Serial No. 603,682

3 Claims. (Cl. 285—49)

This invention pertains to threaded openings or bungs, and the method of making a threaded opening, such as for threaded bungs in sheet metal barrels, drums, container heads and the like, or for other structural members.

An object of this invention is to form a threaded opening or bung in an article, the opening being formed from the material of the article without the necessity of using inserts or other extraneous bracing.

Another object of the invention is to easily and quickly form a threaded opening or head in an article in a simple and effective manner and in such a way as to not affect the strength of the deformed material.

Another object of the invention is to provide a threaded or other opening which forms its own reinforcing means.

Another object of the invention is to provide a threaded opening and the method of forming such an opening which does not weaken the material from which it is made and which may be quickly and economically formed.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a fragmentary sectional elevation of a plate in which there is to be formed a threaded opening such as a bung or the like;

Figures 2 to 7 are fragmentary sectional elevations showing the successive steps in the formation of a threaded opening from the plate illustrated in Figure 1.

In forming a threaded opening in a plate or base such as an end enclosure, header or the like of a container, barrel, drum or the like or in any other structural member, a plate 10 is formed at the selected location with a depression 12 which is preferably circular, having a side wall 14 and an end wall 16. The end wall 16 is then depressed a selected amount as shown in Figure 3, providing a rounded portion or rim 18 and a dished or reentrant portion 20. This reentrant portion 20 is punched as at 22 to provide an opening and the flange 24 so formed is then formed to provide a larger opening 26, as shown in Figure 4, retaining the rounded portion 18, the flange 24 being preferably concentric with the wall 14.

Flange 24 is then reflanged as at 28 (Figure 5), the edge of the flange preferably being moved into relatively tight engagement with the base of the wall 14, i. e., at the junction between wall 14 and plate 10. In other words, the edge of the flange 24 (reflange 28) does not extend substantially below the junction of wall 14 and plate 10, or is substantially in the plane of the bottom surface of plate 10 adjacent the contact between the edge of flange 24 and the base of wall 14. Also a sealing is effected between the reflanged portion and the base of wall 14. Thus with a container using this construction the container may be fully emptied as by pouring, as no traps for the contents of the container are formed.

In the event a threaded opening is to be provided, the flange 24 is then threaded as at 30, Figure 6, the threads being rolled or otherwise formed. Of course, if a threaded plug is not to be used as a closure the threads may be omitted.

As a final step, the recess 32 is formed in the wall 14 in the form of a re-entrant recess, the trough of which extends toward the reflanged portion 28 moving a portion of said wall in further contact with the reflanged portion 28, the recess forming receiving means for a seal and additionally providing a reinforcing rib 34. This contact is over a surface. The plate 10 may then be shaped to its desired shape, depending upon the use to which the article is to be used. Of course, the recess 32 may be omitted if desired, depending upon the strength desired at the opening and use of the article.

The threaded opening may be formed by any desired tool or tools, and of the desired size, depth, etc., an example of a machine for forming the opening described being shown and described in my copending application Serial No. 603,683, filed July 7, 1945, for a Machine for forming threaded openings.

It is to be understood that this application is not to be limited by the exact embodiments of the device shown, which are merely by way of illustration and not limitation as various and other forms of the device will, of course, be apparent to those skilled in the art without departing from the spirit of the invention or the scope of the claims.

I claim:

1. A bung comprising a flat base member, a circular wall extending substantially normal to said base member, said wall having a rounded rim merging into a flange extending toward the article, said flange terminating in a reflanged portion flaring from the flange toward and contacting the base member at the base of the wall, the edge of said reflanged portion terminating substantially at the bottom of said circular wall, threads provided in said flange, and a reentrant recess disposed in said wall adjacent the base member and spaced from the rim and extending toward the reflanged portion.

2. A bung comprising a flat base member, a circular wall extending substantially normal to said base member, said wall having a rounded rim merging into a flange extending toward the article, said flange terminating in a reflanged portion flaring from the flange toward and contacting the base member at the base of the wall, the edge of said reflanged portion terminating substantially at the bottom of said circular wall, and a reentrant recess disposed in said wall adjacent the base member and spaced from the rim and extending toward the reflanged portion.

3. A bung comprising a flat base member, a circular wall extending substantially normal to said base member, said wall having a rounded rim merging into a flange extending toward the base member, said flange terminating in a reflanged portion flaring from the flange toward and contacting the base member at the base of the wall, the edge of said re-flanged portion terminating substantially at the bottom of said circular wall, and contacting the wall over substantially a surface.

ROY J. THOMPSON.

REFERENCES CITED

The following references are of record in the file of this patent:

UNITED STATES PATENTS

| Number | Name | Date |
| --- | --- | --- |
| 1,088,641 | Webster | Feb. 24, 1914 |
| 1,673,425 | Schwartz | June 12, 1928 |
| 2,289,887 | Shapiro | July 14, 1942 |
| 2,299,183 | Shanor | Oct. 20, 1942 |